Patented Mar. 21, 1944

2,344,814

UNITED STATES PATENT OFFICE 2,344,814

PROCESS FOR MANUFACTURE OF ARYL-OXY-ALKYLAMINO BUTANONES

Adolf Grün and Willy Stoll, Basel, Switzerland, assignors to J. R. Geigy A. G., Basel, Switzerland, a firm No Drawing. Application October 2, 1941, Serial No. 413,383. In Switzerland October 8, 1940

2 Claims. (Cl. 260—247)

It has been found according to the present invention that not only the simply constituted phenols, but also those of a complex structure, such as the benzyloxy derivatives, that is to say the benzyl ethers of polyvalent phenols with one free hydroxyl react already under the mildest conditions with monohalogen acetone by forming aryloxy acetones; further that these compounds condense equally easily with hydroxymethyl amines or the mixtures, of formaldehyde and non-tertiary amines, containing hydroxymethyl amines, to butanone derivatives, which can further be reduced to butanols. In this connection it is remarkable and technically important that the reaction between the aryloxy acetone and the hydroxymethyl amine can be so conducted that only equimolecular quantities thereof react to give aryloxyalkylamino butanone in the manner indicated by the diagrammatic equation:

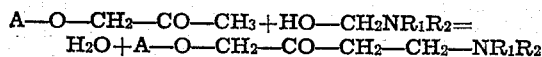

It could, of course, rather be expected that such an easily occurring reaction would go further and yield more or less diamines.

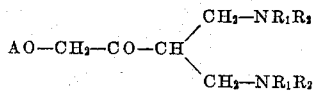

or/and other condensation products. The avoidance or prevention of this by-reaction or succeeding reaction makes it possible to produce the aryloxy-alkylamino butanones and from the latter the butanols even technically, in a simple way and with good to excellent yields. These compounds by the co-operation of the three atom groupings: carbonyl or alcoholhydroxyl, amino and ether group are technically valuable, and this according to the type of aryl or its substituents and according to the type of aryl or its substituents and according to the alkyl or alkylene radicals at the nitrogen, because of the especial capillary activity, as textile assistants and the like or as pharmaceutical products, for example as sedatives, analgesics and hypnotics and so on or as intermediate products.

Among the possible substituents on the aryl radical, the hydroxyl is the most important for the shading of the properties. It is, therefore, particularly advantageous, that according to this invention, it is possible to produce compounds which contain a phenolhydroxyl of this character, i. e., hydroxyaryloxy-alkylamino butanones. This is possible because phenols substituted by benzyloxy groups are usable as initial products and because the compounds produced therefrom containing two ether groups can be split selectively, that is to say so that only the benzyl ether bond is opened, whilst the aryl-butanonyl ether bond remains unaffected. For the same purposes carbomethoxy and carbobenzyloxy radicals can be introduced and split off again easily at the end.

The present invention is illustrated by the following examples; the parts are by weight, and the temperatures are centigrade.

Example 1

Into a mixture of 100 parts of monochloracetone and 116 parts of o-cresol, 400 parts of 10.7% caustic soda lye are allowed to flow gradually whilst stirring at 20–25° C. Stirring is continued, finally at 50° C. until the aqueous layer shows a neutral reaction. Then, 150 to 160 parts of o-cresoxy-acetone have separated out, are removed, washed with dilute lye, dried and distilled.

A solution of 100 parts of piperidine in 180 parts of alcohol is mixed with 81 parts of 30% formaldehyde solution, after cooling, it is treated with 150 parts of o-cresoxy-acetone, boiling point$_{13\ mm.}$ 100–104° C. dissolved in 600 parts of alcohol and heated for 24 hours finally to 50–60° C. After distilling off the alcohol, the residue is taken up with dilute sulfuric acid, the unchanged cresoxy-acetone separated, the free base precipitated from the sulfate solution by concentrated potassium hydroxide solution, collected, dried and distilled. The compound, o-cresoxybutanonyl-piperidine or according to the official nomenclature 1-(2'-methyl-phenoxy-1')-4-piperidyl-butanone-2, is a yellowish, moderately viscous oil, clearly soluble in acids, capable of being precipitated by caustic alkalis, gives the usual ketone reactions, does not boil strictly altogether (because of small admixtures of isomers) boiling point$_{0.8\ mm.}$ 137–141° C.

In exactly the same manner the m- and p-cresoxy butanonyl-piperidines are obtained, by means of the corresponding aryloxy-acetones from the isomer cresols, while from the 1:3:4- and 1:3:5-xylenoles there are obtained the xylenyloxy-butanonyl-piperidines.

Example 2

To a solution of 100 parts of o-cresoxy-acetone and 140 parts of benzene, there is added a cooled mixture of 45 parts of diethylamine and 67 parts of 29.5% formaldehyde solution, 14 parts of sodium chloride are added thereto and the emulsion is stirred for about 50 hours. The base is then isolated, as usual, from the benzene layer by means of the sulfuric acid salt and purified. 1-(2'-methyl-phenoxy-1'-)-4-diethylamino-butanone-2 thus obtained is a colorless liquid, boiling point$_{0.4\ mm.}$ 107–107.5° C.

Instead of diethylamine, one may introduce any aliphatic, secondary amine, such as for example dimethylamine, methylethylamine, methylpropylamine, diamylamine and so on.

In the same way it is possible to obtain from β-naphthol, through β-naphthyloxy-acetone, 1-β-naphthyloxy)-4-diethylamino-butanone-2. α-naphthol reacts in exactly the same manner.

*Example 3*

The condensation of guaiacol and monochloro- or -bromo-acetone by means of caustic soda lye, carried out under the conditions set out in Example 1 for o-cresol, produces in good yield the methoxyl compound, (2'-methoxy-phenoxy)-acetone, vulgarly guaiacoxy-acetone, a yellowish oil, boiling point 11 mm. 96–98° C., analogous to the cresol derivative.

100 parts of the intermediate product are diluted with 120 parts of benzene, then the solution is treated with the mixture prepared, whilst cooled with ice, from about 60 parts of piperidine, 60 parts of formaldehyde solution and 120 parts of benzene, whereupon 15 parts of common salt are added and the whole is shaken for over 50 hours. The preparation worked up in the usual manner produces 1-(2'-methoxy-phenoxy-1')-4-piperidyl-butanone-2 in the form of snow-white, silver shining crystals, melting point 102° C.

Instead of guaiacol other pyrocatechine monoalkyl ethers, for instance pyrocatechine monoethyl, -monopropyl, -monobutyl ether and so on can be used.

*Example 4*

Morpholine is reacted in benzene solution with exceeding formaldehyde and the reaction mixture is allowed to react, under the conditions indicated in Example 3, on o-methoxyphenoxy-acetone. The product, 1-(2'-methoxy-phenoxy-1')-4-morpholinyl-butanone-2, is only obtained as liquid. By reason of its natural yellowish coloring, it cannot be titrated sharply, but nevertheless is characterised as a mono-acidic base (1 g. needs 37.9 cc. $n/10$ acid, calculated 35.8 cc.). The salts are very easily soluble, the hydrochloride, white crystals, melting point 148–150° C., being extremely hygroscopic.

*Example 5*

Methyl-cyclohexylamine, obtained by catalytic hydrogenation from monomethylaniline and fractionation at 148–152° C. is converted with formaldehyde into methylcyclohexylhydroxymethyl amine. The tertiary amine is brought into reaction without being isolated, in the same way as the analogous hydroxymethyl amines according to the preceding examples, with aryloxy acetone and thus produces in a good yield the corresponding amino-ketone. For example, when using o-cresoxyacetone, 1-(2'-methylphenoxy-1')-4-(methyl-cyclohexylamino)-butanone-2 is obtained; when using guaiacoxyacetone, 1-2'-methoxy-phenoxy-1')-4-(methylcyclohexylamino)-butanone 2. The keto bases are viscous, gradually crystallising compounds which with dilute acids give clearly dissolved very hygroscopic salts, which crystallise after concentration.

Instead of methyl-cyclohexylamine there may also be used ethyl-, propyl- or butyl-cyclohexylamine.

*Example 6*

Into a mixture of 120 parts of pyro-catechine monobenzyl ether and 56 parts of monochloro acetone, a solution of 24 parts of caustic soda lye in 200 parts of water is allowed to flow very slowly therein whilst constantly stirring, without heating, within 30–40 hours, and stirring is continued, finally at 40–50° C. until the solution has a neutral reaction. 135–140 parts of (o-benzyloxyphenoxy)-acetone have then separated, which after washing with dilute caustic alkali, drying and distilling are obtained in a pure form as a weakly yellow colored oil, boiling point 3 mm. 165–167° C. Taking into consideration 30 parts of unchanged pyrocatechine ether, which are regenerated from the aqueous layer of the reaction mixture, the yield is about 90% of the theoretical.

A solution of 100 parts of the intermediate product in 200 parts by volume of benzene, is allowed to flow slowly into a cold prepared mixture of 33 parts of piperidine, 79.5 parts of formaldehyde solution, 60 parts of benzene and 20 parts of sodium chloride, whilst self-heating is not allowed to exceed 40° C. Stirring is continued for further 15–20 hours, finally whilst slightly heating, then the benzene layer is removed, concentrated in vacuo and the residue is taken up with dilute sulfuric acid.

From the sulfuric acid solution, freed by extraction from a little neutral matter (=unchanged intermediate product, boiling point 0.05 mm. 150–160° C.), concentrated alkali precipitates 117 parts (=85% of the theoretical) of free base: 1-(2')benzyloxyphenoxy)-4-piperidyl, butanone-2, white crystalline needles, melting point 104.5° C. (crystallised from alcohol) titratable to litmus (1 g. needs 28.65 cc. $n/10$ acid, calculated 28.47 cc.).

For the conversion into the free amino-phenol, 100 parts of the benzyl compound are dissolved in about 600 parts of normal hydrochloric acid; the solution is kept for 20 hours at slight boiling, after cooling the resulting benzylchloride is separated out at a Congo red acid reaction, at phenolphthalein alkaline reaction a little of the unsplit matter is removed, again acidified and then 1-(2-hydroxyphenoxy)-4-piperidyl-butanone-2 is precipitated by means of bicarbonate. After purifying by means of charcoal it forms a viscous liquid which soon solidifies to small crystals, melting point 59° C. The compound exhibits the behaviour of a ketone, an amine and a phenol, it consequently dissolves equally well in caustic alkalis and acids.

Instead of the benzyloxy compound, there may be used equally well the corresponding carbomethoxy, carboethoxy, or carbobenzyloxy compounds in the above example.

*Example 7*

To the reaction mixture of methyl-cyclohexylamine and formaldehyde, which consists substantially of methyl-hydroxy-methyl-cyclohexyl amine (see Example 5), the equimolecular quantity of o-benzyloxyphenoxy acetone, dissolved in the same volume of benzene, and a little common salt are added, then the mixture is stirred for 70 hours and worked up in the same manner as described in Example 6. 1-(2'-benzyloxy-phenoxy) 14-(methylcyclohexyl-amino)-butanone-2 is thus obtained in quantitative yield equally good, qualitative yield rather moderate, in form of a very viscous oil. For the cleavage of the benzyl radical, the hydrochloride of the base is dissolved in a slight excess of normal hydrochloric acid, the solution heated to slight boiling for 24 hours, the free aminophenol isolated, by reason of its solubility in caustic alkali and purified by repeated treatment with charcoal. 1-(2'-hydroxyphenoxy)-4-(methyl-cyclohexylamino)-butanone-2 is a reddish-yellow oil, which only solidifies after standing for a long time, boiling at 0.3 mm. between 160–170° C. not without partial decomposition. With acids it gives easily soluble salts with a high capillary activity, and with caustic alkalis, according to their concentration, precipitations or solutions of phenolates.

*Example 8*

100 parts of (o-benzyloxy-phenoxy)-acetone, produced according to Example 6, are dissolved in 90 parts of benzene and the solution is stirred with a mixture of 35 parts of morpholine, 50 parts of benzene and 66 parts of a 29.5% formaldehyde solution, gradually added thereto and prepared in the cold and then kept for half a day at room temperature. After the addition of 16 parts of common salt, stirring is continued for 24 hours without heating, then for a further 3 hours at 40–45° C. and working up carried out, as described in Example 6 for the analogous piperidine derivative.

About 70% of the theoretical yield of 1-(2'-benzyloxyphenoxy-1')-4-morpholinyl-butanone-2 is thus obtained, while about 30 per cent of benzyl-oxyphenoxy acetone are recovered unchanged, so that the reaction is effected without loss. The free base crystallises difficultly, the hydrochloride easily (from water, dilute alcohol and so forth, melting point 209° C.).

For the reduction of the amino ketone it is dissolved in ten to twelve times the quantity of absolute alcohol, one third of the weight of ketone of sodium is added gradually to the boiling solution whilst passing nitrogen therethrough, stirring the resulting suspension and gradually adding a further third or two thirds of sodium.

The reduction being completed, the reaction mixture is cooled to 0° C., weakly over-neutralised with ice-cold, half-diluted hydrochloric acid, the separated sodium chloride removed and the alcohol distilled off in vacuo. The remaining salt paste is dissolved in excess dilute hydrochloric acid, the solution at first refluxed for 6 hours, after the addition of a little about 8–10% hydrochloric acid, boiled for a further 10 hours. Thereupon the resulting benzyl chloride and, after the addition of sodium hydroxide solution, little unsplit benzyl compound, are separated as usual and the free base, 1-(2'-hydroxyphenoxy-1')-4-morpholinyl-butanol-2, is purified by crystallisation. It forms white crystals (from methanol), melting point 113.5–114° C., dissolves easily in organic solvents, in dilute acids and in caustic alkalis; the free amino-phenol-alcohol and its salts with alkalis are very autoxidizable, whereas the salts with acids are resistant to the oxygen of the air.

*Example 9*

When phenol is condensed with monochloroacetone, in the manner described in Example 1 for o-cresol, phenoxy-acetone, boiling point$_{20\,mm.}$ 94–95° C. is obtained. 100 parts thereof are diluted with an equal volume of benzene and this solution is introduced at 10° C. within one hour into the cold-prepared mixture of 68 parts of morpholine, 85 parts of benzene and 134 parts of formaldehyde solution. Stirring is carried out for 24 hours at room temperature, then for a further 3 hours finally at 45° C. and the reaction mixture is then worked up as described in the preceding examples. The yield of 1-phenoxy-4-morpholinyl-butanone-2 amounts to about 78% of the theoretical, but over 20% of phenoxy-acetone are regenerated; the reaction therefore takes place, apart from a slight excess consumption of chloroacetone, almost without loss of material. The product forms white crystals (from methanol) melting point 97° C., exhibits the solubilities to be expected and can be titrated as a mono-acidic base (1 g. needs towards methylorange 40.65 cc. $n/10$ acid, calculated 40.15 cc.). The reduction by means of sodium, carried out as described in Example 8) for the benzyloxy derivative, produces in a smooth reaction 1-phenoxy-4-morpholinyl-butanol-2, which only differs from its 2'-hydroxyl derivative by its insolubility in caustic alkalis.

What we claim is:

1. Process for the production of aryloxy-alkyl-aminobutanones, which comprises alkylating a member of the group consisting of monohydric phenolic bodies of the benzene and naphthalene series with a monohalogen acetone and condensing the resulting aryloxy acetone with a hydroxymethylamine of the following formula $$OH.CH_2.X$$

wherein X means a radical selected from the group consisting of

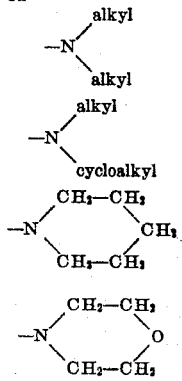

and

2. Process for the production of aryloxy-alkyl-amino-butanones, which comprises alkylating a pyrocatechine monoether of the formula

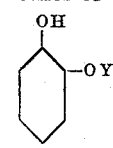

wherein Y means a radical selected from the group consisting of alkyl-, benzyl-, carbomethoxy-, carboethoxy- and carbobenzyloxy-radicals, with monochloro-acetone and condensing the resulting phenoxy-acetone derivative with a hydroxymethylamine of the following formula $$OH.CH_2.X$$

wherein X means a radical selected from the group consisting of

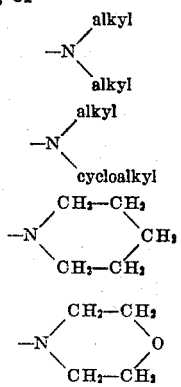

and

ADOLF GRÜN.
WILLY STOLL.